United States Patent
Münch et al.

(10) Patent No.: US 10,808,750 B2
(45) Date of Patent: Oct. 20, 2020

(54) HALF SHELL FOR A TORSION BAR, TORSION BAR BEARING AND METHOD FOR SUPPORTING A TORSION BAR

(71) Applicant: Sumitomo Riko Company Limited, Aichi (JP)

(72) Inventors: Martin Münch, Bad Soden-Salmünster (DE); Jörg Ditzel, Freigericht (DE); Valeri Becker, Schotten (DE)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/527,033

(22) Filed: Jul. 31, 2019

(65) Prior Publication Data

US 2020/0040938 A1 Feb. 6, 2020

(30) Foreign Application Priority Data

Aug. 1, 2018 (DE) .................. 10 2018 006 080
Jun. 12, 2019 (DE) .................. 20 2019 002 544 U

(51) Int. Cl.
*F16C 33/04* (2006.01)
*F16C 17/02* (2006.01)

(52) U.S. Cl.
CPC ................. *F16C 17/022* (2013.01)

(58) Field of Classification Search
CPC ........ B60G 21/0551; B60G 2204/1222; B60G 2204/1224; B60G 2204/1226; B60G 2204/41042; B60G 2204/41044; B60G 2204/4104; F16C 17/022; F16C 33/046; F16C 33/20; F16C 33/203; F16C 33/205; F16C 33/206; F16C 33/22; F16C 33/28; F16C 2326/05
See application file for complete search history.

(56) References Cited

U.S. PATENT DOCUMENTS 2,338,937 A * 1/1944 Hait .................. F16C 33/22
166/68.5
3,820,860 A 6/1974 Stone
(Continued)

FOREIGN PATENT DOCUMENTS

CN 106627030 5/2017
CN 207433180 6/2018
(Continued)

OTHER PUBLICATIONS

"Office Action of German Counterpart Application", dated Mar. 1, 2019, with English translation thereof, p. 1-p. 19.

*Primary Examiner* — Phillip A Johnson
(74) *Attorney, Agent, or Firm* — JCIPRNET

(57) ABSTRACT

The invention relates to a half shell for a torsion bar bearing (10, 10A), comprising: a half-shell body (1, 1A, 1B, 1C, 1D, 1E) formed in one piece and along a body axis (A); and at least one stiffening device (8, 8A, 8B, 8C, 8D, 8E) adapted to increase a rigidity of the half-shell body (1, 1A, 1B, 1C, 1D, 1E). The invention relates further to a torsion bar bearing (10, 10A) comprising: at least one first half shell and at least one second half shell, wherein at least one of the at least one half shell is disposed opposite to at least one of the at least one second half shell with respect to a torsion bar axis, and to a method of supporting a torsion bar.

14 Claims, 14 Drawing Sheets

(56) References Cited

U.S. PATENT DOCUMENTS

| | | | | |
|---|---|---|---|---|
| 4,916,749 A | * | 4/1990 | Urban | F16C 33/20 |
| | | | | 384/298 |
| 5,112,031 A | | 5/1992 | Hynds et al. | |
| 6,845,994 B2 | * | 1/2005 | Cai | B60G 21/0551 |
| | | | | 267/140.12 |
| 2006/0091595 A1 | * | 5/2006 | Hayashi | B60G 21/0551 |
| | | | | 267/276 |
| 2012/0097827 A1 | | 4/2012 | Klink et al. | |

FOREIGN PATENT DOCUMENTS

| | | | | |
|---|---|---|---|---|
| DE | 102012208156 A1 | * | 11/2013 | ........... B60G 21/055 |
| DE | 102013201058 A1 | * | 7/2014 | ......... B60G 21/0551 |
| DE | 102014015870 | | 4/2016 | |
| DE | 102016008270 | | 1/2018 | |
| EP | 3326846 | | 5/2018 | |
| WO | 2010149756 | | 12/2010 | |

\* cited by examiner

HALF SHELL FOR A TORSION BAR, TORSION BAR BEARING AND METHOD FOR SUPPORTING A TORSION BAR

CROSS-REFERENCE TO RELATED APPLICATION

This application claims the priority benefit of DE application serial no. 102018006080.3, filed on Aug. 1, 2018, and DE application serial no. 202019002554.8, filed on Jun. 12, 2019. The entirety of the above-mentioned patent applications is hereby incorporated by reference herein and made a part of this specification.

BACKGROUND

Technical Field

The invention relates to a half shell for a torsion bar bearing, to a torsion bar bearing comprising at least two such half shells, and to a method for supporting a torsion bar.

Description of Related Art

The invention lies in the field of torsion bar technology, in particular in the field of bearing technology for torsion bars. A torsion bar or torsion bar spring is a bar spring which is adapted so that shear stresses occur in its interior when the torsion bar twists. A bearing for the torsion bar must therefore be formed to be correspondingly resistant to the forces that occur.

Accordingly, the object of the present invention is to provide a half shell for torsion bar bearings having increased radial rigidity and an increased working life.

This object is achieved in particular by a half shell for a torsion bar bearing, a torsion bar bearing comprising at least two such half shells, and a method for supporting a torsion bar, in each case according to the independent claims. Preferred embodiments form the subject-matter of the dependent claims.

SUMMARY

One aspect relates to a half shell for a torsion bar bearing, comprising a half-shell body formed in one piece and along a body axis, and at least one stiffening device adapted to increase a rigidity of the half-shell body.

One aspect relates to a torsion bar bearing comprising at least one first half shell and at least one second half shell, wherein at least one of the at least first half shell is disposed opposite to at least one of the at least one second half shell with respect to a torsion bar axis.

A further aspect relates to a method for supporting a torsion bar, comprising providing a torsion bar, providing at least one first half shell, providing at least one second half shell, disposing one of the at least one first half shell on the torsion bar and disposing one of the at least one second half shell opposite to the one of the at least one first half shell with respect to a torsion bar axis.

BRIEF DESCRIPTION OF THE DRAWINGS

The invention will be explained further hereinbelow with reference to exemplary embodiments illustrated by figures. The embodiments shown in the figures are in particular not to be understood as being limiting for the invention. It will be appreciated that individual features of the respective embodiments can freely be combined to form further embodiments. In the Figures.

DESCRIPTION OF THE EMBODIMENTS

Figure 1:
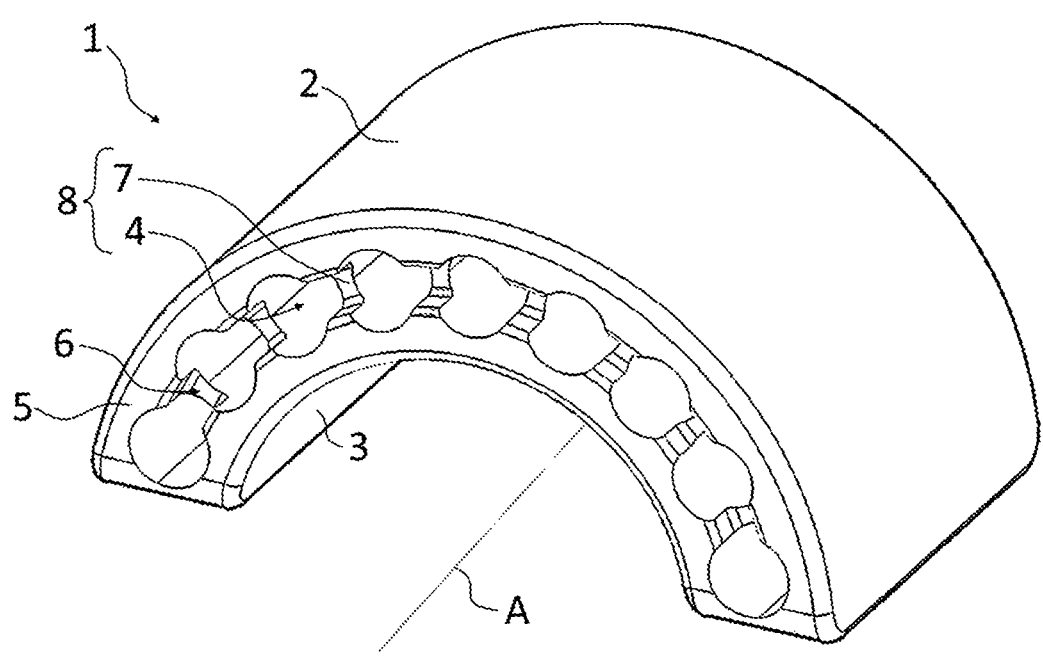
FIG. 1 is a perspective view of a half-shell body.

Within the scope of this description, rigidity is to be understood as meaning the resistance of a body to elastic deformation by a force and/or a torque. The torsion bar bearing is adapted to support at least one torsion bar. The torsion bar bearing is here not limited to the supporting of a torsion bar but can also be used to support a bar of any kind. In an operating state of the torsion bar bearing, the half-shell body encloses a torsion bar at least partially, in particular at least partially radially or circumferentially with respect to a torsion bar axis and at least partially axially with respect to or along the torsion bar axis. In particular, the half-shell body can be adapted to enclose the torsion bar in the operating state circumferentially, that is to say in the circumferential direction, with respect to the torsion bar axis by approximately 50%, less than approximately 50% or more than approximately 50%. In other words, the half-shell body can be adapted to enclose the torsion bar in the operating state circumferentially, that is to say in the circumferential direction, with respect to the torsion bar axis over approximately 180°, less than approximately 180° or more than approximately 180°.

The half shell comprises a half-shell body formed in one piece, wherein in one piece in this sense is to be understood as meaning formed integrally and/or manufactured from one material and/or manufactured in one production step. The half-shell body is further in particular of hollow cylindrical form and has an inner surface and an outer surface. The body axis can here in particular be identical to a center axis of the half-shell body of hollow cylindrical form. The inner surface is here a surface of the half-shell body facing towards the body axis, which at least partially encircles the body axis. The outer surface is here a surface of the half-shell body facing away from the body axis, which at least partially encircles the body axis. At least one of the inner surface and the outer surface is here preferably substantially continuous, whereby the stiffening effect of the half shell can be improved. The half-shell body can further have a front face and a rear face, wherein the front face and the rear face are disposed opposite to one another on the half-shell body, and wherein a normal vector of the front face and a normal vector of the rear face are preferably parallel to one another. Furthermore, the normal vector of the front face and/or the normal vector of the rear face can be formed parallel to the body axis. A length of the half-shell body corresponds to a distance between the front face and the rear face, measured parallel to the body axis, or to a greatest distance between the front face and the rear face, measured parallel to the body axis.

Preferably, the at least one stiffening device comprises at least one inner rib element, wherein the at least one inner rib element is disposed on the inner surface of the half-shell body. The at least one inner rib element here extends or runs at least partially over the inner surface of the half-shell body and is thereby adapted to increase the resistance of the half-shell body to elastic deformation by a force and/or a torque, in particular by a force and/or a torque which is transmitted or brought about by a torsion bar.

The inner rib element can here in particular be in the form of a projection or web portion protruding inward from the inner surface of the half-shell body. The inner rib element can further have a height with which the inner rib element protrudes from the inner surface, wherein the height is measured radially with respect to the body axis starting from the inner surface. The height of the inner rib element can in particular be constant along a direction parallel to the body axis, in order to permit a uniform rigidity adaptation, or variable along a direction parallel to the body axis, in order to permit a locally adapted rigidity adaptation.

The inner rib element can further have a rib wall diameter or a rib wall thickness, wherein the rib wall diameter is measured perpendicular to the radial direction with respect to the body axis and perpendicular to the body axis and quantifies a thickness of a rib wall. The rib wall diameter of the at least one inner rib element can in particular be constant along a direction parallel to the body axis, in order to permit a uniform rigidity adaptation. The rib wall diameter can in particular have a value of at least approximately 1 mm, preferably at least approximately 1.5 mm, and/or not more than approximately 15 mm, preferably not more than approximately 10 mm. In particular, such a form of inner rib elements allows a material thickness of the half-shell body to be kept below a threshold value. By keeping the material thickness, which can correspond to the rib wall diameter, below such a threshold value, negative effects based on a long injection time in the production of thick half-shell bodies, such as, for example, warping or deformation of the half-shell body, can be reduced or avoided.

The height of the inner rib element can in particular be constant along a direction circumferential to the body axis, in order to permit a uniform rigidity adaptation, or variable along a direction circumferential to the body axis, in order to permit a locally adapted rigidity adaptation. The at least one stiffening device can further have at least two inner rib elements which cross.

The at least one inner rib element can in particular be adapted to increase the resistance of the half-shell body to elastic deformation by a force and/or a torque, in particular by a force and/or a torque which is transmitted or brought about by a torsion rod, and to prevent or reduce undesirable warping or deformation of the half-shell body during temperature fluctuations, in particular during the production of the half-shell body, for example injection molding of the half-shell body.

Preferably, the at least one inner rib element includes at least one inner axial rib element which is formed substantially parallel to the body axis. The at least one inner axial rib element can here extend at least partially parallel to the body axis and can thus counteract, or reduce or prevent, an axial deformation of the half-shell body. The at least one inner axial rib element can in particular extend over the entire length of the half-shell body, in order to permit a uniform rigidity adaptation of the half-shell body. The height of the at least one inner axial rib element can here in particular be adapted to the local rigidity requirements. In particular, the at least one inner rib element can include a plurality of inner axial rib elements, for example 2, 3, 4, 5, 6, 7, 8 or more, which can be disposed at regular or irregular intervals along the inner surface of the half-shell body.

Preferably, the at least one inner rib element includes at least one inner circumferential rib element which is adapted to encircle the body axis in the manner of a part-circle. The at least one inner circumferential rib element can here at least partially encircle the body axis in the manner of a part-circle and can thus counteract, or reduce or prevent, a radial deformation of the half-shell body. The at least one inner circumferential rib element can extend in particular from a first end of the inner surface to a second end of the inner surface opposite to the first end, in order to permit a uniform rigidity adaptation of the half-shell body. The height of the at least one inner circumferential rib element can here in particular be adapted to the local rigidity requirements. In particular, the at least one inner rib element can include a plurality of inner circumferential rib elements, for example 2, 3, 4, 5, 6, 7, 8 or more, which can be disposed at regular or irregular intervals along the inner surface of the half-shell body.

Preferably, the at least one inner rib element includes at least one first inner spiral-like rib element which is adapted to at least partially encircle the body axis in the manner of a spiral, wherein the at least one inner rib element preferably includes at least one second inner spiral-like rib element which is adapted to at least partially encircle the body axis in the manner of a spiral and to cross the at least one first inner spiral-like rib element. It is thus possible to counteract, or reduce or prevent, in particular an axial and a radial deformation of the half-shell body. However, the half-shell body is not limited to such a form, and the at least one inner rib element can have at least two inner spiral-like rib elements which are adapted to at least partially encircle the body axis in the manner of a helix without crossing.

Preferably, the at least one inner rib element includes a plurality of inner rib elements which are disposed along edges of a tiling of the inner surface, for example according to a honeycomb pattern. The term tiling is here to be understood in the mathematical sense, that is to say as a covering of the inner surface by part-surfaces or tiles, in particular uniform part-surfaces or tiles, with no gaps and no overlaps. To that end, the inner surface can be represented mathematically as a Euclidean plane, for example by unrolling the inner surface about the body axis. Mathematically, this can be represented, for example, in an X-Y coordinate system, wherein the X-coordinate corresponds to a distance parallel to the body axis along the inner surface and the Y-coordinate corresponds to a distance in the circumferential direction with respect to the body axis along the inner surface. Other possible forms of the inner surface on a Euclidean plane are, however, likewise possible and known, for example, on the basis of a map projection from cartography. The tiling can here be a periodic tiling, for example a honeycomb pattern (e.g. based on a hexagonal grid), or an aperiodic tiling, for example a Penrose tiling.

Preferably, the at least one inner rib element can be formed integrally or in one piece with the half-shell body.

This makes possible, for example, a simple one-step production process for the half-shell body. In particular, at least one inner rib element of the at least one inner rib elements can be formed integrally or in one piece with the half-shell body.

Preferably, the at least one inner rib element can be mounted on the half-shell body or on the inner surface. The rigidity of a half-shell body can thus be adapted by mounting the inner rib elements that are necessary or required in a particular case. In particular the production of the half-shell bodies and the production of the inner rib elements can thus be separated from one another, whereby a production process for the half shell can be made more flexible.

Preferably, the at least one inner rib element has an at least part-circle-like and/or an at least partially rectangular or rectangle-like and/or an at least partially triangular or triangle-like and/or an at least partially trapezium-like cross-sectional profile. The cross-sectional profile of an inner rib element at a position or at a point is here given by the shape of the cross-section of the inner rib element in a cross-sectional plane. The cross-sectional plane is here the plane that includes a perpendicular line through the point in question to the body axis and in which a diameter of the inner rib element perpendicular to the perpendicular line is minimal. In particular, an inner rib element can have different cross-sectional profiles at different points along the inner rib element.

Preferably, the at least one stiffening device comprises at least one outer rib element, wherein the at least one outer rib element is disposed on the outer surface of the half-shell body. The at least one outer rib element here extends or runs at least partially over the outer surface of the half-shell body and is thereby adapted to increase the resistance of the half-shell body to elastic deformation by a force and/or a torque, in particular by a force and/or a torque which is transmitted or brought about by a torsion bar.

The outer rib element can here in particular be in the form of a projection or web portion protruding outward from the outer surface of the half-shell body. The outer rib element can further have a height with which the outer rib element protrudes from the outer surface, wherein the height is measured radially with respect to the body axis starting from the outer surface. The height of the outer rib element can in particular be constant along a direction parallel to the body axis, in order to permit a uniform rigidity adaptation, or variable along a direction parallel to the body axis, in order to permit a locally adapted rigidity adaptation.

The outer rib element can further have a rib wall diameter or a rib wall thickness, wherein the rib wall diameter is measured perpendicular to the radial direction with respect to the body axis and perpendicular to the body axis and quantifies a thickness of the rib wall. The rib wall diameter of the at least one outer rib element can in particular be constant along a direction parallel to the body axis, in order to permit a uniform rigidity adaptation. The rib wall diameter can in particular have a value of at least approximately 1 mm, preferably at least approximately 1.5 mm, and/or not more than approximately 15 mm, preferably not more than approximately 10 mm. In particular, such a form of outer rib elements allows a material thickness of the half-shell body to be kept below a threshold value. By keeping the material thickness, which can correspond to the rib wall diameter, below such a threshold value, negative effects based on a long injection time in the production of thick half-shell bodies, such as, for example, warping or deformation of the half-shell body, can be reduced or avoided.

The height of the outer rib element can in particular be constant along a direction circumferential to the body axis, in order to permit a uniform rigidity adaptation, or variable along a direction circumferential to the body axis, in order to permit a locally adapted rigidity adaptation. The at least one stiffening device can further have at least two outer rib elements which cross.

The at least one outer rib element can in particular be adapted to increase the resistance of the half-shell body to elastic deformation by a force and/or a torque, in particular by a force and/or a torque which is transmitted or brought about by a torsion rod, and to prevent or reduce undesirable warping or deformation of the half-shell body during temperature fluctuations, in particular during the production of the half-shell body, for example injection molding of the half-shell body.

Preferably, the at least one outer rib element includes at least one outer axial rib element which is formed substantially parallel to the body axis. The at least one outer axial rib element can here extend at least partially parallel to the body axis and can thus counteract, or reduce or prevent, an axial deformation of the half-shell body. The at least one outer axial rib element can extend in particular over the entire length of the half-shell body, in order to permit a uniform rigidity adaptation of the half-shell body. The height of the at least one outer axial rib element can here in particular be adapted to the local rigidity requirements. In particular, the at least one outer rib element can include a plurality of outer axial rib elements, for example 2, 3, 4, 5, 6, 7, 8 or more, which can be disposed at regular or irregular intervals along the outer surface of the half-shell body.

Preferably, the at least one outer rib element includes at least one outer circumferential rib element which is adapted to encircle the body axis at least in the manner of a part-circle. The at least one outer circumferential rib element can here at least partially encircle the body axis in the manner of a part-circle and can thus counteract, or reduce or prevent, a radial deformation of the half-shell body. The at least one outer circumferential rib element can extend in particular from a first end of the outer surface to a second end of the outer surface opposite to the first end, in order to permit a uniform rigidity adaptation of the half-shell body. The height of the at least one outer circumferential rib element can here in particular be adapted to the local rigidity requirements. In particular, the at least one outer rib element can include a plurality of outer circumferential rib elements, for example 2, 3, 4, 5, 6, 7, 8 or more, which can be disposed at regular or irregular intervals along the outer surface of the half-shell body.

Preferably, the at least one outer rib element includes at least one first outer spiral-like rib element which is adapted to at least partially encircle the body axis in the manner of a spiral, wherein the at least one outer rib element preferably includes at least one second outer spiral-like rib element which is adapted to at least partially encircle the body axis in the manner of a spiral and to cross the at least one first outer spiral-like rib element. It is thus possible to counteract, or reduce or prevent, in particular an axial and a radial deformation of the half-shell body. However, the half-shell body is not limited to such a form, and the at least one outer rib element can have at least two outer spiral-like rib elements which are adapted to at least partially encircle the body axis in the manner of a helix without crossing.

Preferably, the at least one outer rib element comprises a plurality of outer rib elements which are disposed along edges of a tiling of the outer surface, for example according to a honeycomb pattern. The term tiling is here to be understood in the mathematical sense, that is to say as a covering of the outer surface by part-surfaces or tiles, in particular uniform part-surfaces or tiles, with no gaps and no overlaps. To that end, the outer surface can be represented mathematically as a Euclidean plane, for example by unrolling the outer surface about the body axis. Mathematically, this can be represented, for example, in an X-Y coordinate system, wherein the X-coordinate corresponds to a distance parallel to the body axis along the outer surface and the Y-coordinate corresponds to a distance in the circumferential direction with respect to the body axis along the outer surface. Other possible forms of the outer surface on a Euclidean plane are, however, likewise possible and known, for example, on the basis of a map projection from cartography. The tiling can here be a periodic tiling, for example a honeycomb pattern based on a hexagonal grid, or an aperiodic tiling, for example a Penrose tiling.

Preferably, the at least one outer rib element can be formed integrally or in one piece with the half-shell body. This makes possible, for example, a simple one-step production process for the half-shell body. In particular, at least one outer rib element of the at least one outer rib elements can be formed integrally or in one piece with the half-shell body.

Preferably, the at least one outer rib element can be mounted on the half-shell body or on the outer surface. The rigidity of a half-shell body can thus be adapted by mounting the outer rib elements that are necessary or required in a particular case. In particular the production of the half-shell bodies and the production of the outer rib elements can thus be separated from one another, whereby a production process for the half shell can be made more flexible.

Preferably, the at least one outer rib element has an at least part-circle-like and/or an at least partially rectangular or rectangle-like and/or an at least partially triangular or triangle-like and/or an at least partially trapezium-like cross-sectional profile. The cross-sectional profile of an outer rib element at a position or at a point is here given by the shape of the cross-section of the outer rib element in a cross-sectional plane. The cross-sectional plane is here the plane that includes a perpendicular line through the point in question to the body axis and in which a diameter of the outer rib element perpendicular to the perpendicular line is minimal. In particular, an outer rib element can have different cross-sectional profiles at different points along the outer rib element.

Preferably, the at least one stiffening device comprises at least one internal rib element, wherein the at least one internal rib element is disposed in the half-shell body. In particular, the at least one internal rib element can be disposed between the inner surface of the half-shell body and the outer surface of the half-shell body. The at least one internal rib element here extends or runs at least partially through the half-shell body and is thereby adapted to increase the resistance of the half-shell body to elastic deformation by a force and/or a torque, in particular by a force and/or a torque which is transmitted or brought about by a torsion bar.

The internal rib element can further have a radial diameter, wherein the radial diameter is measured along a radial direction with respect to the body axis. The radial diameter of the at least one internal rib element can in particular be constant along a direction parallel to the body axis, in order to permit a uniform rigidity adaptation, or variable along a direction parallel to the body axis, in order to permit a locally adapted rigidity adaptation.

The internal rib element can further have a rib wall diameter or a rib wall thickness, wherein the rib wall diameter is measured perpendicular to the radial direction with respect to the body axis and perpendicular to the body axis and quantifies a thickness of the rib wall. The rib wall diameter of the at least one internal rib element can in particular be constant along a direction parallel to the body axis, in order to permit a uniform rigidity adaptation. The rib wall diameter can in particular have a value of at least approximately 1 mm, preferably at least approximately 1.5 mm, and/or not more than approximately 15 mm, preferably not more than approximately 10 mm. In particular, such a form of internal rib elements allows a material thickness of the half-shell body to be kept below a threshold value. By keeping the material thickness, which can correspond to the rib wall diameter, below such a threshold value, negative effects based on a long injection time in the production of thick half-shell bodies, such as, for example, warping or deformation of the half-shell body, can be reduced or avoided.

The radial diameter of the at least one internal rib element can in particular be constant along a direction circumferential to the body axis, in order to permit a uniform rigidity adaptation, or variable along a direction circumferential to the body axis, in order to permit a locally adapted rigidity adaptation. The at least one stiffening device can further have at least two internal rib elements which cross.

The at least one internal rib element can in particular be adapted to increase the resistance of the half-shell body to elastic deformation by a force and/or a torque, in particular by a force and/or a torque which is transmitted or brought about by a torsion rod, and to prevent or reduce undesirable warping or deformation of the half-shell body during temperature fluctuations, in particular during the production of the half-shell body, for example injection molding of the half-shell body.

Preferably, the at least one internal rib element includes at least one internal axial rib element which is formed substantially parallel to the body axis. The at least one internal axial rib element can extend at least partially parallel to the body axis and can thus counteract, or reduce or prevent, an axial deformation of the half-shell body. The at least one internal axial rib element can extend in particular over the entire length of the half-shell body, in order to permit a uniform rigidity adaptation of the half-shell body. The radial diameter of the at least one internal axial rib element can here in particular be adapted to the local rigidity requirements. In particular, the at least one internal rib element can include a plurality of internal axial rib elements, for example 2, 3, 4, 5, 6, 7, 8 or more, which can be disposed at regular or irregular intervals in or in the interior of the half-shell body.

Preferably, the at least one internal rib element includes at least one internal circumferential rib element which is adapted to encircle the body axis at least in the manner of a part-circle. The at least one internal circumferential rib element can here at least partially encircle the body axis in the manner of a part-circle and can thus counteract, or reduce or prevent, a radial deformation of the half-shell body. The at least one internal circumferential rib element can extend in particular completely through the half-shell body along a circumferential direction with respect to the body axis, in order to permit a uniform rigidity adaptation of the half-shell body. The radial diameter of the at least one internal circumferential rib element can here in particular be adapted to the local rigidity requirements. In particular, the at least one internal rib element can include a plurality of internal circumferential rib elements, for example 2, 3, 4, 5, 6, 7, 8 or more, which can be disposed at regular or irregular intervals in or in the interior of the half-shell body.

Preferably, the at least one internal rib element includes at least one first internal spiral-like rib element which is adapted to at least partially encircle the body axis in the manner of a spiral, wherein the at least one internal rib element preferably includes at least one second internal spiral-like rib element which is adapted to at least partially encircle the body axis in the manner of a spiral and to cross the at least one first internal spiral-like rib element. It is thus possible to counteract, or reduce or prevent, in particular an axial and a radial deformation of the half-shell body. However, the half-shell body is not limited to such a form, and the at least one internal rib element can have, for example, at least two internal spiral-like rib elements which are adapted to at least partially encircle the body axis in the manner of a helix without crossing.

Preferably, the at least one internal rib element includes a plurality of internal rib elements which are disposed along edges of a tiling of an internal intermediate surface, for example according to a honeycomb pattern. The internal intermediate surface is here to be understood as being an imaginary surface which is parallel to the inner surface and the outer surface or which is at a constant distance from the inner surface and a constant distance from the outer surface, and which is disposed between the inner surface and the outer surface. The term tiling is here to be understood in the mathematical sense, that is to say as a covering of the internal intermediate surface by part-surfaces or tiles, in particular uniform part-surfaces or tiles, with no gaps and no overlaps. To that end, the internal intermediate surface can be represented mathematically as a Euclidean plane, for example by unrolling the internal intermediate surface about the body axis. Mathematically, this can be represented, for example, in an X-Y coordinate system, wherein the X-coordinate corresponds to a distance parallel to the body axis along the internal intermediate surface and the Y-coordinate corresponds to a distance in the circumferential direction with respect to the body axis along the internal intermediate surface. Other possible forms of the internal intermediate surface on a Euclidean plane are, however, likewise possible and known, for example, on the basis of a map projection from cartography. The tiling can here be a periodic tiling, for example a honeycomb pattern based on a hexagonal grid, or an aperiodic tiling, for example a Penrose tiling.

Preferably, the at least one internal rib element can be formed integrally or in one piece with the half-shell body. This makes possible, for example, a simple one-step production process for the half-shell body. In particular, at least one outer rib element of the at least one outer rib elements can be formed integrally or in one piece with the half-shell body. Preferably, at least one internal rib element can be formed enclosed by the half-shell body.

Preferably, the at least one internal rib element has an at least part-circle-like and/or an at least partially rectangular or rectangle-like and/or an at least partially triangular or triangle-like and/or an at least partially trapezium-like cross-sectional profile. The cross-sectional profile of an internal rib element at a position or at a point is here given by the shape of the cross-section of the internal rib element in a cross-sectional plane. The cross-sectional plane is here the plane that includes a perpendicular line through the point in question to the body axis and in which a diameter of the internal rib element perpendicular to the perpendicular line is minimal. In particular, an internal rib element can have different cross-sectional profiles at different points along the outer rib element.

Preferably, at least one internal rib element is formed as at least one zone or as at least one volume of the half-shell body, wherein the at least one zone or the at least one volume has a higher density or rigidity than an average density or average rigidity of the half-shell body. The resistance of the half-shell body to elastic deformation by a force and/or a moment can thus be increased without the use of additional or external elements. This can be achieved in particular during the production of the half-shell body, for example by an injection molding process. Standing sound waves, for example, can here be generated in the liquid material of the half-shell body, which generate a pattern of density fluctuations. A targeted density adaptation within the half-shell body can thus be achieved.

Preferably, the at least one stiffening device is formed by at least one recess or bore in the half-shell body. The at least one recess or bore can be formed substantially parallel to the body axis and/or can extend in the circumferential direction of the half-shell body. The at least one recess or bore can be formed as a through-hole through the half-shell body. The at least one recess or bore can here extend or run from the front face of the half-shell body to the rear face of the half-shell body. In particular, the at least one recess or bore can be disposed between the inner surface of the half-shell body and the outer surface of the half-shell body and/or along the outer surface and/or along the inner surface. The at least one recess or bore can further have a radial diameter, wherein the radial diameter is measured along a radial direction with respect to the body axis. The radial diameter of the at least one recess or bore can in particular be constant along a direction parallel to the body axis, in order to permit a uniform rigidity adaptation, or variable along a direction parallel to the body axis, in order to permit a locally adapted rigidity adaptation. The radial diameter of the at least one recess or bore can in particular be constant along a direction circumferential to the body axis, in order to permit a uniform rigidity adaptation, or variable along a direction circumferential to the body axis, in order to permit a locally adapted rigidity adaptation. The at least one stiffening device can further have at least two recesses or bores which cross.

Preferably, the at least one recess or bore includes at least one axial recess or bore which is formed substantially parallel to the body axis. The at least one axial recess or bore can here extend at least partially parallel to the body axis and can thus counteract, or reduce or prevent, an axial deformation of the half-shell body. The at least one axial recess or bore can in particular extend over the entire length of the half-shell body, in order to permit a uniform rigidity adaptation of the half-shell body. The radial diameter of the at least one axial recess or bore can here in particular be adapted to the local rigidity requirements.

The at least one axial recess or bore can in particular include a plurality of axial recesses or bores. The plurality of axial recesses or bores can here be divided into at least one first group of axial recesses or bores, which are each at a first minimum distance from the body axis, and into at least one second group of axial recesses or bores, which are each at a second minimum distance from the body axis. Each axial recess or bore of the first group can in particular be disposed adjacent to at least one axial recess or bore of the second group, wherein two axial recesses or bores are understood to be adjacent when they are separated from one another by a material of the half-shell body and no other axial recess or bore is disposed between the two axial recesses or bores.

Each axial recess or bore of the second group can in particular be disposed adjacent to at least one axial recess or bore of the first group. In particular, the recesses or bores of the first group and of the second group can be disposed alternately in the circumferential direction with respect to the body axis.

In particular, the plurality of axial recesses or bores along the half-shell body in a plane which is perpendicular to the body axis can form a honeycomb structure or be formed in a honeycomb-like arrangement.

Preferably, the at least one recess or bore includes at least one circumferential recess or bore which is adapted to encircle the body axis at least in the manner of a part-circle. The at least one circumferential recess or bore can here at least partially encircle the body axis in the manner of a part-circle, and can thus counteract, or reduce or prevent, a radial deformation of the half-shell body. The at least one circumferential recess or bore can in particular extend completely through the half-shell body along a circumferential direction with respect to the body axis, in order to permit a uniform rigidity adaptation of the half-shell body. The radial diameter of the at least one circumferential recess or bore can here in particular be adapted to the local rigidity requirements.

Preferably, the at least one recess or bore includes at least one radial recess or bore which is formed in particular substantially perpendicularly to the body axis. The at least one radial recess or bore can here extend substantially parallel to a radial direction with respect to the body axis. The at least one radial recess or bore can in particular have a circumferential diameter, wherein the circumferential diameter is measured in the circumferential direction with respect to the body axis. The circumferential diameter of a radial recess or bore can be formed substantially constantly or variably for the uniform and/or locally adapted rigidity adaptation along a radial direction with respect to the body axis.

Preferably, the at least one recess or bore includes at least a plurality of parallel recesses or bores which are formed in particular substantially parallel to a common direction. In other words, a main direction can be provided, wherein each of the plurality of parallel recesses or bores extend along a direction which is substantially parallel to the main direction. Preferably, the main direction is formed along a line of intersection between a plane which is perpendicular to the body axis and a plane in which the body axis lies, and which notionally divides the half-shell body into two pieces of equal size.

Preferably, the at least one recess or bore includes a plurality of recesses or bores which are disposed between and/or along edges of a tiling of the inner surface and/or of the outer surface and/or of an internal intermediate surface, for example according to a honeycomb pattern. The internal intermediate surface is here to be understood as being a notional surface which is parallel to the inner surface and the outer surface or which is at a constant distance from the inner surface and a constant distance from the outer surface, and which is disposed between the inner surface and the outer surface. The term tiling is here to be understood in the mathematical sense, that is to say as a covering of the inner surface and/or of the outer surface and/or of the internal intermediate surface by part-surfaces or tiles, in particular uniform part-surfaces or tiles, with no gaps and no overlaps. To that end, the inner surface and/or the outer surface and/or the internal intermediate surface can be represented mathematically as a Euclidean plane, for example by unrolling the inner surface and/or the outer surface and/or the internal intermediate surface about the body axis. Mathematically, this can be represented, for example, in an X-Y coordinate system, wherein the X-coordinate corresponds to a distance parallel to the body axis along the inner surface or the outer surface or the internal intermediate surface and the Y-coordinate corresponds to a distance in the circumferential direction with respect to the body axis along the inner surface or the outer surface or the internal intermediate surface. Other possible forms of the inner surface and/or the outer surface and/or the internal intermediate surface on a Euclidean plane are, however, likewise possible and known, for example, on the basis of a map projection from cartography. The tiling can here be a periodic tiling, for example a honeycomb pattern based on a hexagonal grid, or an aperiodic tiling, for example a Penrose tiling.

Preferably, the at least one recess or bore has an at least part-circle-like and/or an at least partially rectangular or rectangle-like and/or an at least partially triangular or triangle-like and/or an at least partially trapezium-like and/or an at least partially honeycomb-like or hexagonal cross-sectional profile. The cross-sectional profile is not limited to the mentioned possible shapes, however, but can be formed according to a plurality of shapes, for example at least partially circular, at least partially elliptical, at least partially oval-shaped, at least partially quadrangular and/or polygonal. The cross-sectional profile of a recess or bore at a position or at a point is here given by the shape of the cross-section of the recess or bore in a cross-sectional plane. The cross-sectional plane is here the plane that is perpendicular to a direction of extension along which the recess or bore in question extends. This can be, for example, a plane which includes a perpendicular line through the point in question to the body axis and in which a diameter of the recess or bore perpendicular to the perpendicular line is minimal. In particular, a recess or bore can have different cross-sectional profiles at different points along the recess or bore. In particular, a change in the cross-sectional profiles, for example within the meaning of draft angles or mold bevels, is necessary in the demolding of the half-shell body from a production tool.

Preferably, at least one recess or bore is not completely enclosed by the half-shell body, or is open radially or axially outward. In particular a further use, for example within the scope of a jacketing of the half-shell body as further described below, can thus be simplified.

Preferably, the front face and/or the rear face of the half-shell body can each have at least one surface structure. In particular, the surface structure can extend at least partially over the front face and/or over the rear face, or the surface structure can have a structure surface which corresponds at least partially to a surface of the front face and/or a surface of the rear face. In particular, the front face can have a first surface structure and the rear face can have a second surface structure, wherein the first surface structure and the second surface structure have mirror symmetry relative to one another. However, the first surface structure and the second surface structure are not limited to such a form. The first surface structure can instead be geometrically similar to or different from the second surface structure.

Preferably, the surface structure, or the first surface structure and/or the second surface structure, comprises a plurality of structural recesses and/or structural projections which are disposed along edges of a tiling of the structural surface in question, for example according to a honeycomb pattern. The term tiling is here to be understood in the mathematical sense, that is to say as a covering of the structural surface in question by part-surfaces or tiles, in particular uniform part-surfaces or tiles, with no gaps and no overlaps. To that end, the structural surface in question can be represented mathematically as a Euclidean plane. Mathematically, this can be represented, for example, in an X-Y coordinate system, wherein the X-axis and the Y-axis are each oriented perpendicularly to the body axis. The tiling can here be a periodic tiling, for example a honeycomb pattern based on a hexagonal grid, or an aperiodic tiling, for example a Penrose tiling.

Preferably, the half-shell body is formed of a metal and/or a plastic and/or a composite material. In particular, the half-shell body has a body thickness along a radial direction with respect to the body axis. The body thickness can in particular have a value of at least 3 mm, preferably at least approximately 6 mm, and/or not more than approximately 30 mm, preferably not more than approximately 20 mm. In order to prevent or reduce distortion or warping during production of the half-shell body, in particular during injection molding of the half-shell body, a uniform form of the body thickness and/or of the rib wall thicknesses is preferred.

Preferably, at least one of the at least one recess or bore is open only toward the outer surface and partially extends through the half-shell body. Preferably, the at least one recess or bore that is open toward the outer surface extends through the half-shell body over at least approximately 10% of the body thickness of the half-shell body, preferably at least approximately 30% of the body thickness of the half-shell body, further preferably at least approximately 50% of the body thickness of the half-shell body, and/or over not more than approximately 95% of the body thickness of the half-shell body, preferably not more than approximately 90% of the body thickness of the half-shell body, further preferably not more than approximately 80% of the body thickness of the half-shell body.

Preferably, at least one of the at least one recess or bore is open only toward the inner surface and partially extends through the half-shell body. Preferably, the at least one recess or bore that is open toward the inner surface extends through the half-shell body over at least approximately 10% of the body thickness of the half-shell body, preferably at least approximately 30% of the body thickness of the half-shell body, further preferably at least approximately 50% of the body thickness of the half-shell body, and/or over not more than approximately 95% of the body thickness of the half-shell body, preferably not more than approximately 90% of the body thickness of the half-shell body, further preferably not more than approximately 80% of the body thickness of the half-shell body.

Preferably, at least one of the at least one recess or bore is open toward the outer surface and the inner surface and extends completely through the half-shell body. In other words, the at least one recess or bore preferably includes at least one through-hole which is open toward both the inner surface and the outer surface. The provision of one or more such through-holes through the half-shell body can in particular permit simplified overmolding of the half-shell body, since overmolding material is able to flow through the through-holes between the inner surface and the outer surface during an overmolding step. The through-hole can, however, be formed to taper toward the inner surface or toward the outer surface, for example to approximately 50%, approximately 30%, approximately 10% or less of the diameter of the through-hole on the other side. The stiffening effect of the half shell can thus be improved.

Preferably, the half shell comprises a jacket means, which at least partially encloses the half-shell body and the at least one stiffening device, and optionally, wherein the jacket means is formed of an elastomer. In particular, the half-shell is preferably circumferentially rubberized. Preferably, the jacket means encloses the half shell substantially completely. Should the half-shell body have at least one bore or recess, the jacket means can further fill the at least one bore or recess at least partially, preferably substantially completely. The jacket means can be connected to the half-shell body and the at least one stiffening device in particular by at least one overmolding step and/or at least one vulcanization step.

Preferably, the half shell further comprises a fastening device, which is designed to secure the half shell to a corresponding half shell, and optionally, wherein the fastening device has at least one latching element and/or at least one screw element and/or at least one pressing element. In particular, the fastening device can be designed to secure the half shell to a corresponding half shell in the operating state, so that the half shell and the corresponding half shell are fixed relative to the torsion bar. The fastening device can in particular be designed to secure the half shell to a corresponding half shell during mounting of the torsion bar bearing.

The half shell can in particular be formed to be dimensionally stable to temperature fluctuations. Dimensionally stable is here to be understood as meaning that the half shell substantially does not change shape even during operation-related temperature fluctuations.

The torsion bar axis is here to be understood as being an imaginary axis which in the operating state of the torsion bar bearing corresponds to the longitudinal axis of a torsion bar which is supported by the torsion bar bearing. In particular, the at least one first half shell can have any combination of the features disclosed in the description. In particular, the at least one second half shell can have any combination of the features disclosed in the description. In particular, the at least one first half shell and the at least one second half shell can be identical. In particular, at least one first half shell can enclose the torsion bar circumferentially with respect to the torsion bar axis over more than 180°.

Preferably, the torsion bar bearing comprises at least one frame device which is configured to: to hold or fix at least one of the at least one first half shell and at least one of the at least one second half shell relative to one another; and/or hold or fix at least two of the at least one first half shell relative to one another; and/or hold or fix at least two of the at least one second half shell relative to one another. The frame device can here enclose the at least one first half shell and the at least one second half shell circumferentially with respect to the torsion bar axis. In particular, the frame device can be configured to increase the rigidity of the torsion bar bearing and/or to protect the torsion bar bearing from external environmental influences, for example particles, dust, moisture and damage.

In particular, the at least one first half shell can have any combination of the features disclosed in the description. In particular, the at least one second half shell can have any combination of the features disclosed in the description. In particular, the at least one first half shell and the at least one second half shell can be identical. The at least one first half shell can enclose the torsion bar circumferentially with respect to the torsion bar axis also over more than approximately 180°.

FIG. 1 is a perspective view of a half-shell body 1. The half-shell body 1 is here in particular formed in one piece. Furthermore, the half-shell body 1 is in hollow cylindrical form, wherein the half-shell body 1 corresponds substantially to a hollow cylinder which is cut into half along its axis. However, the half-shell body 1 is not limited to a form in which it is cut into half in that manner but can correspond to any division of the hollow cylinder along its axis. Furthermore, the half-shell body 1 can also be formed according to different geometries, for example according to a cuboid with a cylindrical recess for partially receiving the torsion bar. The axis here corresponds in particular to the body axis A of the half-shell body 1.

The half-shell body 1 has an inner surface 3 and an outer surface 2. The inner surface 3 is here a surface, in particular a cylindrical surface, of the half-shell body 1 that faces towards the body axis A and at least partially encircles the body axis A. The outer surface 2 is here a surface, in particular a cylindrical surface, of the half-shell body 1 that faces away from the body axis A and at least partially encircles the body axis A. The half-shell body 1 further has a front face 5 and a rear face (not shown for illustrative reasons), wherein the front face 5 and the rear face are disposed opposite to one another on the half-shell body 1. The front face 5 and the rear face are in particular parallel to one another, and a normal vector of the front face 5 is in particular formed parallel to the body axis A.

The half-shell body 1 comprises nine recesses or bores 4 in the half-shell body 1, wherein the recesses or bores 4 are preferably formed substantially parallel to the body axis A. The nine recesses or bores 4 are here in the form of a through-hole through the half-shell body 1, but the half-shell body 1 is not limited to such a form. In particular, one or more recesses or bores 4 can extend not completely through the half-shell body 1, wherein in particular along the one or more of the recesses or bores 4 have one or more separating walls perpendicular to the body axis, which separate the one or more recesses or bores 4 from one another or close them to the outside. The nine recesses or bores 4 here extend or run in particular from the front face 5 of the half-shell body 1 to the rear face (not shown) of the half-shell body 1. In particular, the recesses or bores 4 are disposed between the inner surface 3 of the half-shell body 1 and the outer surface 2 of the half-shell body 1. The recesses or bores 4 have in particular an equal radial diameter, wherein the radial diameter is measured along a radial direction with respect to the body axis A. The recesses or bores 4 have in particular an equal radial diameter, wherein the radial diameter is measured along the front face 5 of the half-shell body 1. It is thus possible to ensure in particular a uniform distribution of a material, for example an elastomer, during a jacketing process, for example overmolding, of the half-shell body 1. The radial diameter of the recesses or bores 4 can here be determined in accordance with the particular rigidity values that are required and/or in accordance with the physical properties of the material which is used for jacketing. The radial diameter can here have a value of, for example, at least 3 mm, preferably at least 5 mm, most preferably at least 6 mm, and not more than 25 mm, preferably not more than 15 mm, most preferably not more than 8 mm.

The half-shell body 1 can in particular further have further recesses or bores 4 according to the recesses or bores 4 described herein, for example one or more recesses or bores 4 which encircle the body axis A in the manner of a part-circle.

The half-shell body 1 further has at least one, in particular eight, internal rib elements 7, wherein the internal rib elements 7 are disposed in the half-shell body 1. However, a half-shell body 1 can here also have more than eight and fewer than eight internal rib elements 7. The internal rib elements 7 here extend or run at least partially through the half-shell body 1 and are thereby designed to increase the resistance of the half-shell body 1 to elastic deformation by a force and/or a torque, in particular by a force and/or a torque which is transmitted or effected by a torsion bar. The radial diameter of an internal rib element 7 can in particular be constant along a direction circumferential to the body axis A, in order to permit a uniform rigidity adaptation, or variable along a direction circumferential to the body axis A, in order to permit a locally adapted rigidity adaptation. Each of the internal rib elements 7 further has a minimum thickness, wherein the minimum thickness of each internal rib element 7 is measured in a circumferential direction with respect to the body axis A.

The internal rib elements 7 are in particular in the form of internal axial rib elements, which are formed substantially parallel to the body axis A. The internal axial rib elements can here extend parallel to the body axis A. Preferably, the internal rib elements 7 are formed integrally or in one piece with the half-shell body 1.

The half-shell body 1 can in particular further have further internal rib elements 7 according to the internal rib elements 7 described herein, for example one or more internal rib elements 7 which encircle the body axis A in the manner of a part-circle.

The internal rib elements 7 and the recesses or bores 4 here form a stiffening device 8 of the half shell. The stiffening device 8 is, however, not limited to such a form and instead can have any combination of the features of the stiffening devices described herein.

The half-shell body 1 further has at least one circumferential groove 6 which at least partially encircles the body axis A, in particular in the manner of a part-circle. A circumferential groove 6 is here disposed on the front face 5 of the half-shell body 1, wherein a further circumferential groove 6 can be disposed on the rear face of the half-shell body 1. It is here possible for at least one circumferential groove 6 to be disposed on the front face 5 of the half-shell body 1 and at least one circumferential groove 6 to be disposed on the rear face of the half-shell body 1. At least one circumferential groove 6 of the front face 5 and at least one circumferential groove 6 of the rear face can here preferably be formed mirror-symmetrically to one another, that is to say there is an imaginary mirror plane at which the at least one circumferential groove 6 of the front face 5 can be reproduced by surface reflection at the mirror plane onto the at least one circumferential groove 6 of the rear face. Alternatively, the at least one circumferential groove 6 of the front face 5 and the at least one circumferential groove 6 of the rear face can be formed not mirror-symmetrically to one another. The at least one circumferential groove 6 of the front face 5 and/or the at least one circumferential groove 6 of the rear face are in particular formed to join together at least two, preferably all of the recesses or bores 4.

The at least one circumferential groove 6 is here in particular formed to allow the half-shell body 1 to be fixed in a production tool for producing the half shell. Furthermore, the at least one circumferential groove 6 is in particular formed to provide an equalizing channel for an elastomer of the jacket means 11 during a production process for the jacket means 11. The at least one circumferential groove 6 has a substantially quadrangular cross-sectional profile, wherein the at least one circumferential groove 6 can, however, have any cross-sectional profile.

Figure 2:
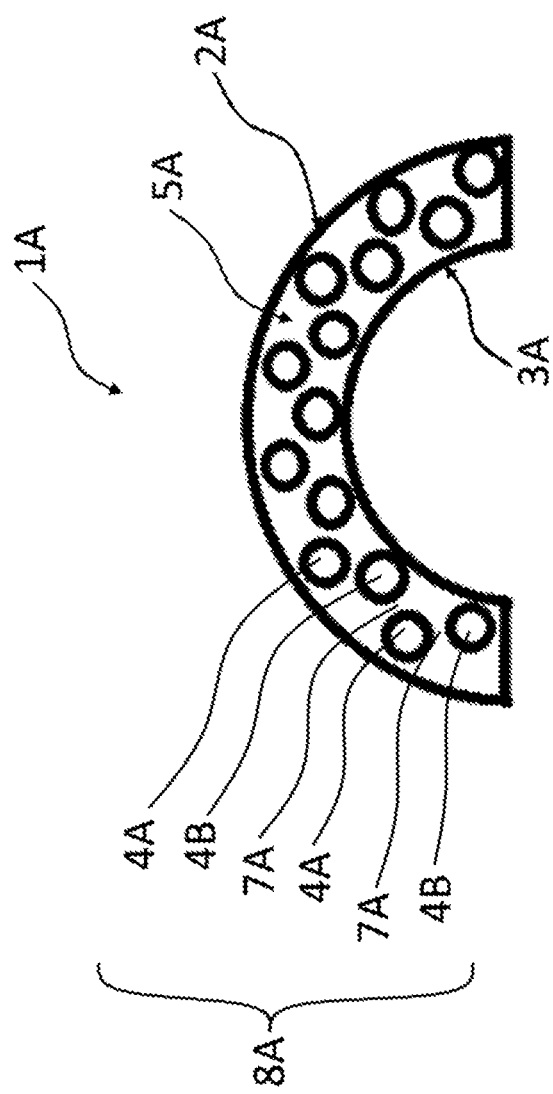
FIG. 2 is a schematic cross-sectional view of a further half-shell body.

FIG. 2 is a schematic cross-sectional view of a further half-shell body 1A. The half-shell body 1A is here in particular formed in one piece. Furthermore, the half-shell body 1A is in hollow cylindrical form, wherein the half-shell body 1A corresponds substantially to a hollow cylinder which is cut into half along its axis. However, the half-shell body 1A is not limited to a form in which it is cut into half in that manner but can correspond to any division of the hollow cylinder along its axis. Furthermore, the half-shell body 1A can also be formed according to different geometries, for example according to a cuboid with a cylindrical recess for partially receiving the torsion bar. The axis here corresponds in particular to the body axis A of the half-shell body 1A.

The half-shell body 1A has an inner surface 3A and an outer surface 2A. The inner surface 3A is here a surface, in particular a cylindrical surface, of the half-shell body 1A that faces towards the body axis A and at least partially encircles the body axis A. The outer surface 2A is here a surface, in particular a cylindrical surface, of the half-shell body 1A that faces away from the body axis A and at least partially encircles the body axis A. The half-shell body 1A further has a front face 5A and a rear face (not shown for illustrative reasons), wherein the front face 5A and the rear face are disposed opposite to one another on the half-shell body 1A. The front face 5A and the rear face are in particular parallel to one another, and a normal vector of the front face 5A is in particular formed parallel to the body axis A.

The half-shell body 1A here has a plurality of axial recesses or bores 4A, 4B. The plurality of axial recesses or bores 4A, 4B is here divided into a first group of axial recesses or bores 4A, which are each at a first minimum distance from the body axis, and at least one second group of axial recesses or bores 4B, which are each at a second minimum distance from the body axis. In particular, the first minimum distance is greater than the second minimum distance. In particular, the recesses or bores 4A, 4B of the first group and of the second group are disposed alternately in the circumferential direction with respect to the body axis. In particular, the recesses 4A, 4B are spaced apart or separated from one another by an internal rib element 7A. The recesses or bores 4A, 4B and the internal rib elements 7A here form the stiffening device 8A.

Figure 3:
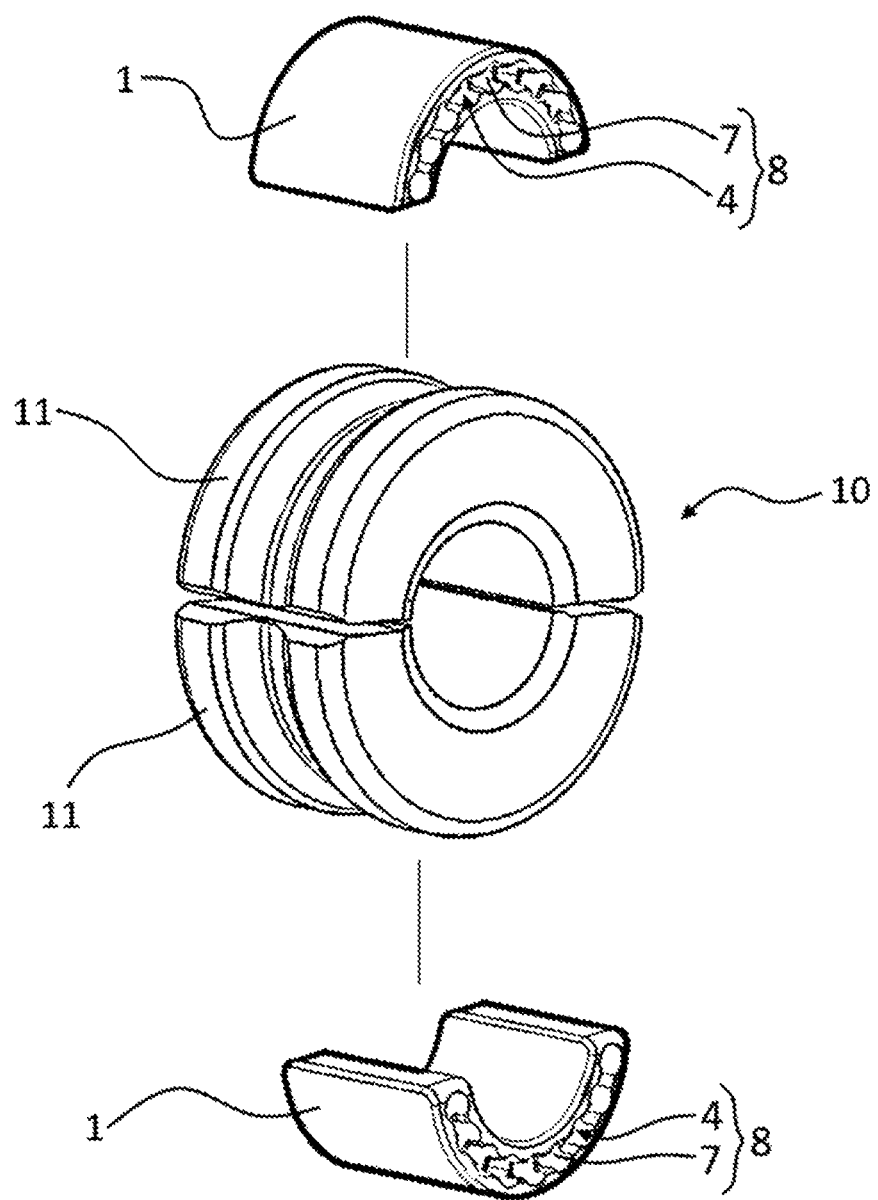
FIG. 3 is an exploded view of a torsion bar bearing.

FIG. 3 is an exploded view of a torsion bar bearing 10. The torsion bar bearing 10 is here formed in particular of two half shells, wherein each half shell in particular comprises a jacket means 11 and a half-shell body 1. The half-shell body 1 here corresponds, by way of example, to the half-shell body 1 from FIG. 1, but it can correspond to a half-shell body having any combination of the features described herein.

The respective jacket means 11 here in particular completely encloses the respective half-shell body 1, wherein the jacket means 11 and the respective half-shell body 1 are permanently connected. The two jacket means 11 and the half-shell bodies 1 enclosed thereby are in particular so oriented in the torsion bar bearing 10 that a torsion bar receiver 12 (see FIG. 4 and the following Figures) is formed to receive or support a torsion bar along a bearing axis of the torsion bar bearing 10. The bearing axis of the torsion bar bearing 10 corresponds in particular to an axis of a torsion bar which is supported by the torsion bar bearing 10. In particular, an adhesion promoter can be used or disposed between the respective half-shell body 1 and the respective jacket means 11.

Figure 4:
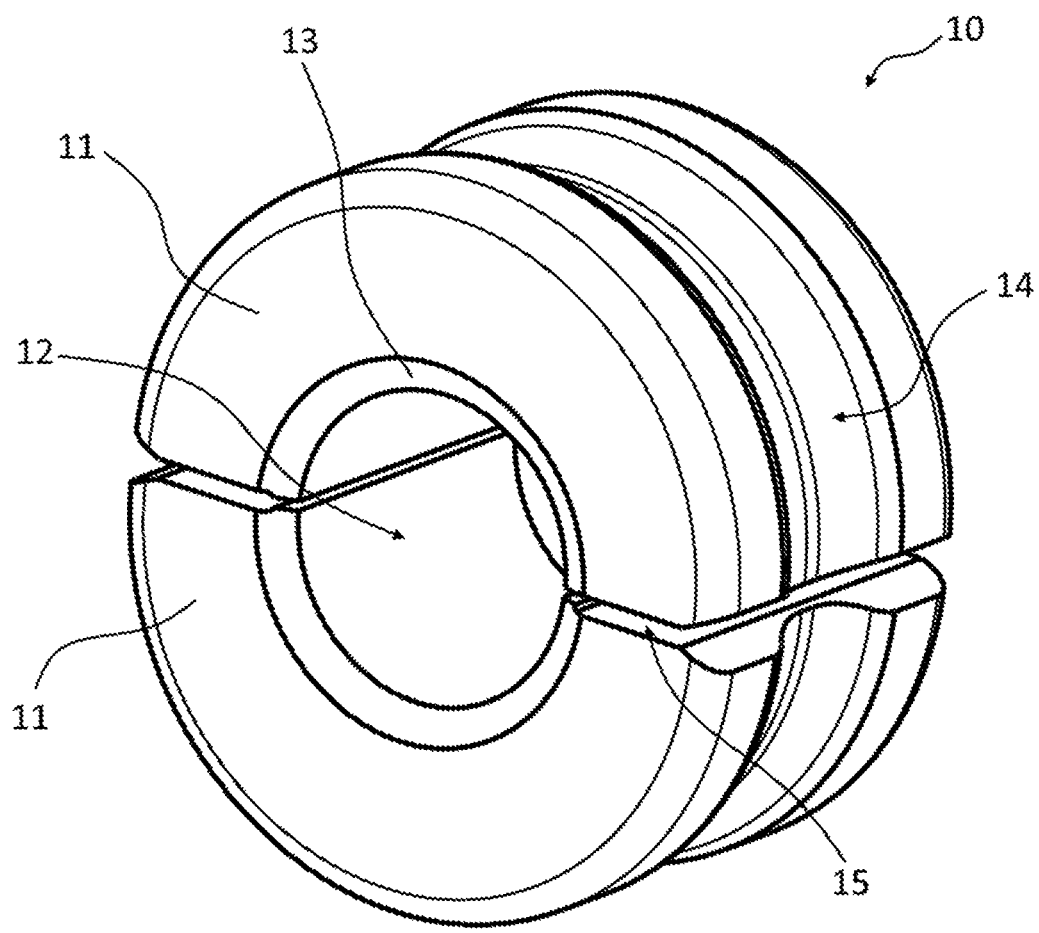
FIG. 4 is a perspective view of a torsion bar bearing.

FIG. 4 is a perspective view of a torsion bar bearing 10. The torsion bar bearing can here in particular be formed in accordance with the torsion bar bearing 10 from FIG. 3 but is not limited to such a form. The torsion bar bearing 10 here comprises in particular two half shells, wherein each half shell has a jacket means 11. Each of the jacket means 11 can enclose at least one half-shell body, which can have any combination of the features described herein. Preferably, the jacket means 11 are identical. The two half shells or the jacket means 11 of the two half shells form in particular a cylindrical torsion bar receiver 12 for receiving or supporting a torsion bar along a bearing axis of the torsion bar bearing 10.

The jacket means 11 each have in particular at least one part-ring-shaped portion 13 which adjoins the torsion bar receiver 12. The part-ring-shaped portion 13 here has in particular a surface, wherein a normal vector of the surface of the part-ring-shaped portion 13 forms an acute angle with the bearing axis. The surface of the part-ring-shaped portion can in particular be formed by adaptation of said acute angle in order to establish a contact region between the respective jacket means 11 and a torsion bar supported by the torsion bar bearing 10.

The jacket means 11 or the torsion bar bearing 10 further have in particular a bearing groove 14 which is circumferential with respect to the bearing axis and which is formed on the jacket means 11 and open outward in the radial direction with respect to the bearing axis. Efficient and reliable mounting of the torsion bar bearing 10 can be ensured by the bearing groove 14.

The torsion bar bearing 10 further has at least two gaps 15, which are disposed between the jacket means 11. The gaps 15 are in particular formed so that, by compressing the torsion bar bearing 10 along at least one direction that is perpendicular to the bearing axis, the gaps 15 are closed in order to bring the adjoining or adjacent jacket means 11 into contact. The gaps 15 can in particular be formed to taper inward with respect to the bearing axis in a radial direction.

Figure 5:
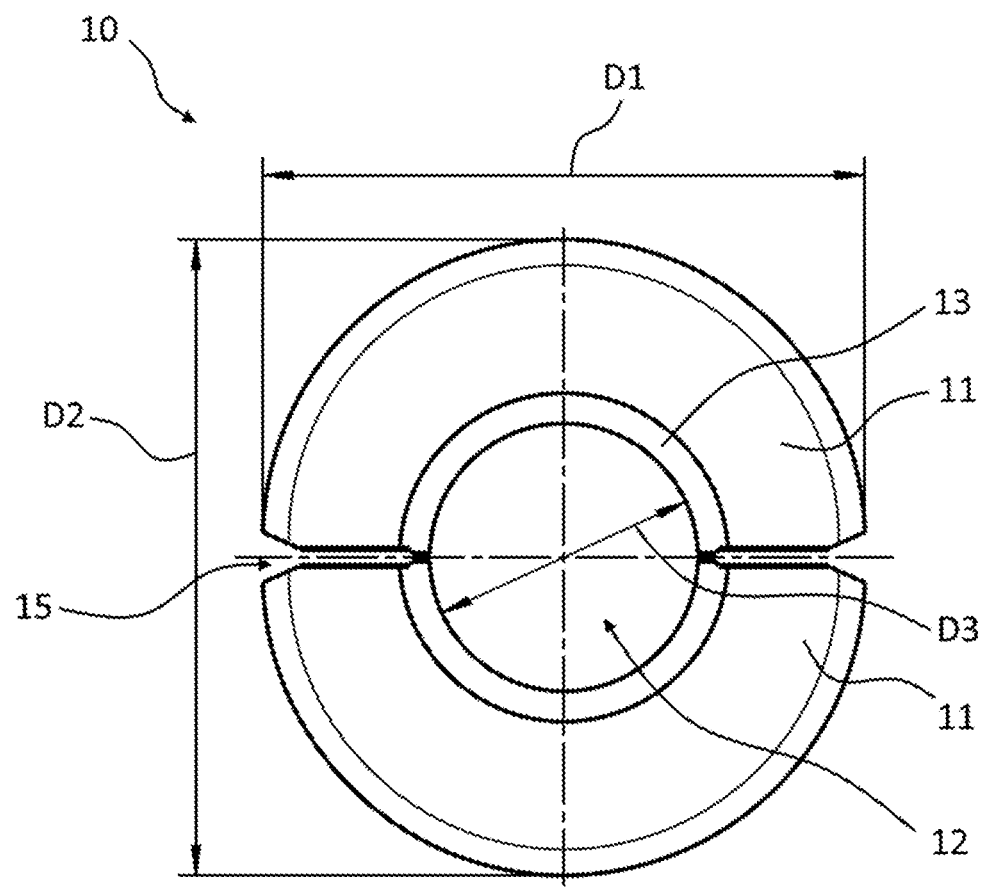
FIG. 5 is a front view of the torsion bar bearing, for example according to FIG. 4.

FIG. 5 shows a front view of the torsion bar bearing 10, wherein the torsion bar bearing 10 can be formed in particular in accordance with FIG. 4. The torsion bar bearing 10 here has in particular two gaps 15, wherein the gaps 15 are formed along a gap plane which also includes the bearing axis of the torsion bar bearing 10.

The torsion bar bearing 10 here in particular has a width D1 which is measured in the gap plane and perpendicular to the bearing axis. The torsion bar bearing 10 can here have a width D1 of, for example, at least approximately 40 mm, preferably at least approximately 50 mm, most preferably at least approximately 60 mm, and not more than approximately 250 mm, preferably not more than approximately 100 mm, most preferably not more than approximately 75 mm.

The torsion bar bearing 10 here has in particular a height D2 which is measured parallel to a normal vector of the gap plane and perpendicular to the bearing axis. The torsion bar bearing 10 can here have a height D2 of, for example, at least approximately 45 mm, preferably at least approximately 55 mm, most preferably at least approximately 65 mm, and not more than approximately 250 mm, preferably not more than approximately 100 mm, most preferably not more than approximately 80 mm. The width D1 and the height D2 here do not have to be identical. Preferably, the height D2 is in particular greater than the width D1.

The torsion bar bearing 10 here in particular has a receiving diameter D3, which corresponds to a distance between the half shells or jacket means 11, which is measured perpendicular to the bearing axis. The torsion bar bearing 10 can here have a receiving diameter D3 of, for example, at least approximately 10 mm, preferably at least approximately 20 mm, most preferably at least approximately 30 mm, and not more than approximately 100 mm, preferably not more than approximately 80 mm, most preferably not more than approximately 60 mm.

Figure 6:
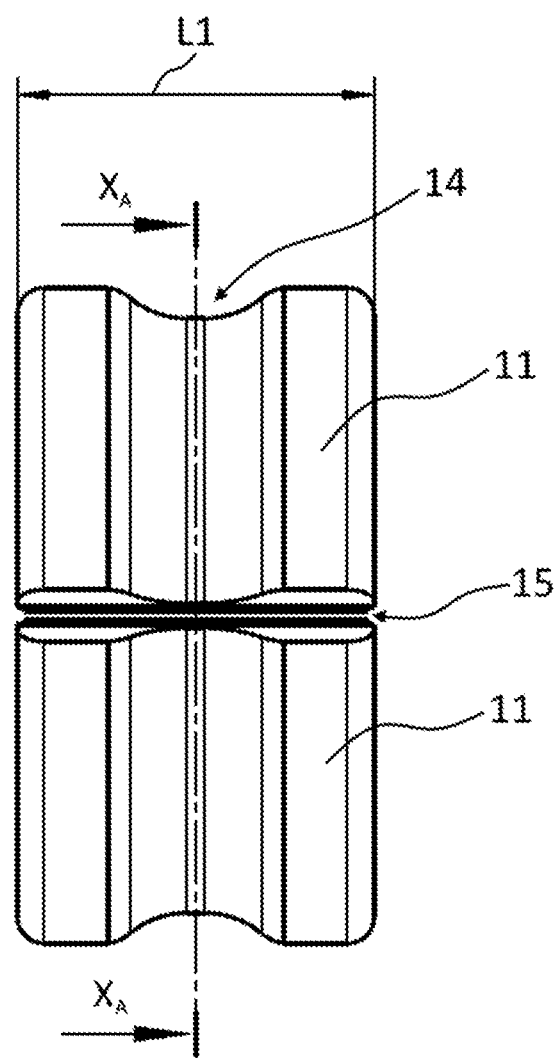
FIG. 6 is a side view of the torsion bar bearing, for example according to FIG. 4.

FIG. 6 is a side view of the torsion bar bearing 10, wherein the torsion bar bearing 10 can in particular be formed in accordance with FIG. 4.

The torsion bar bearing 10 here in particular has a length L1, which corresponds to a maximum diameter of the torsion bar bearing 10, measured parallel to the bearing axis. The torsion bar bearing 10 can here have a length L1 of, for example, at least approximately 20 mm, preferably at least approximately 30 mm, most preferably at least approximately 35 mm, and not more than approximately 150 mm, preferably not more than approximately 100 mm, most preferably not more than approximately 60 mm.

The bearing groove 14 has in particular a U-shaped cross-section in a first cross-sectional plane, which includes the bearing axis. The bearing groove 14 can, however, have any other cross-sectional profile, for example a V-shaped or a rectangular cross-sectional profile.

Figure 7:
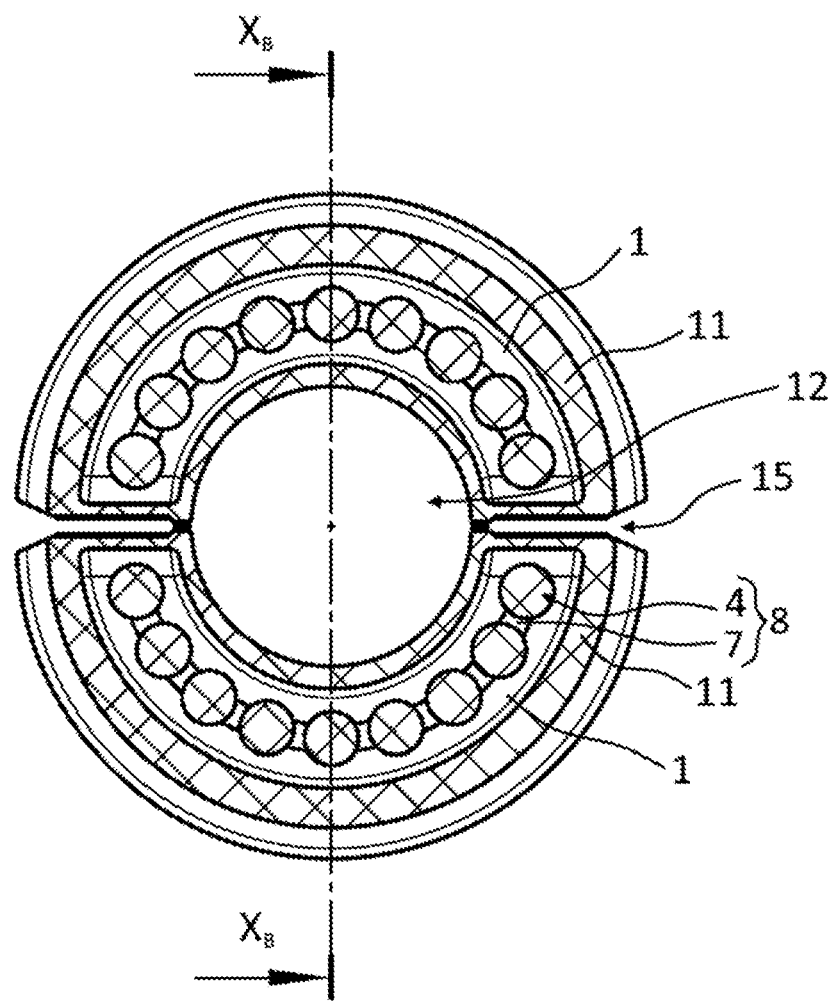
FIG. 7 is a cross-sectional view of the torsion bar bearing according to FIG. 6.

FIG. 7 is a cross-sectional view of the torsion bar bearing 10 along the cutting line XA-XA according to FIG. 6. The torsion bar bearing 10 here has, for example, two half shells, wherein the half shells, for example, each have a jacket means 11 and a half-shell body 1, wherein the half-shell body 1 is formed in accordance with FIG. 1. Each jacket means 11 here completely encloses a half-shell body 1, wherein a material of the jacket means 11 at least partially fills the recesses or bores 4.

Figure 8:
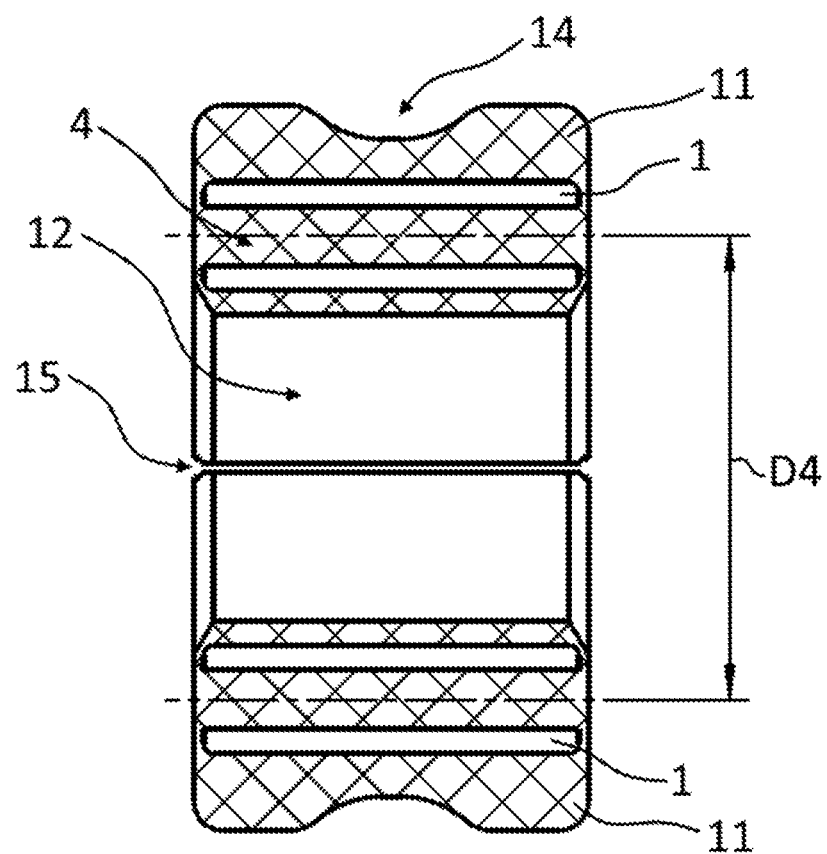
FIG. 8 is a cross-sectional view of the torsion bar bearing according to FIG. 7.

FIG. 8 is a cross-sectional view of the torsion bar bearing 10 along the cutting line XB-XB according to FIG. 7. The torsion bar bearing 10 here has, for example, two half shells, wherein the half shells, for example, each have a jacket means 11 and a half-shell body 1, wherein the half-shell body 1 is formed in accordance with FIG. 1. Each jacket means 11 here completely encloses a half-shell body 1, wherein a material of the jacket means 11 completely fills the recesses or bores 4.

The torsion bar bearing 10 here in particular has a distance D4 between a center axis of a first recess or bore 4 and a center axis of a second recess or bore 4 which is opposite to the first recess or bore 4 with respect to the bearing axis, wherein the distance D4 is measured perpendicular to the bearing axis of the torsion bar bearing 10. The torsion bar bearing 10 can here have a distance D4, for example, of at least approximately 24 mm, preferably at least approximately 34 mm, most preferably at least approximately 44 mm, and not more than approximately 80 mm, preferably not more than approximately 60 mm, most preferably not more than approximately 50 mm. In a case in which the recesses or bores 4 in a torsion bar bearing 10 are not formed as opposite pairs of recesses or bores 4 with respect to the bearing axis, the torsion bar bearing 10 has a radial distance D5 (not shown) between a center axis of a recess or bore 4 and the bearing axis of the torsion bar bearing 10, wherein the distance D5 is measured perpendicular to the bearing axis of the torsion bar bearing 10. The torsion bar bearing 10 can here have, for example, a distance D4 of at least approximately 12 mm, preferably at least approximately 17 mm, most preferably at least approximately 22 mm, and not more than approximately 40 mm, preferably not more than approximately 30 mm, most preferably not more than approximately 25 mm.

Figure 9:
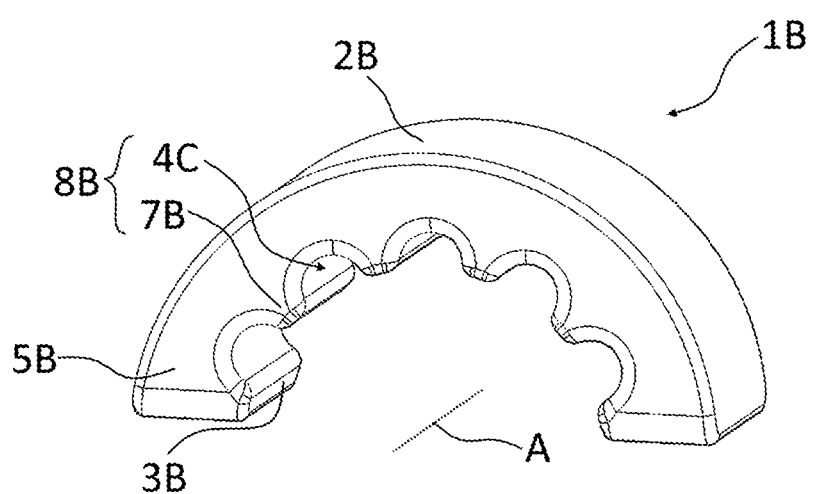
FIG. 9 is a perspective view of a further half-shell body.

FIG. 9 is a perspective view of a further exemplary embodiment of a half-shell body 1B. The half-shell body 1B is here in particular formed in one piece. Furthermore, the half-shell body 1B is in hollow cylindrical form, wherein the half-shell body 1B corresponds substantially to a hollow cylinder which is cut into half along its axis.

The half-shell body 1B has an inner surface 3B and an outer surface 2B. The half-shell body 1B further has a front face 5B and a rear face (not shown for illustrative reasons), wherein the front face 5B and the rear face are disposed opposite to one another on the half-shell body 1B. The front face 5B and the rear face are in particular parallel to one another, and a normal vector of the front face 5B is in particular formed parallel to the body axis A.

The half-shell body 1B comprises five recesses or bores 4C in the half-shell body 1B, wherein the recesses or bores 4C are preferably formed substantially parallel to the body axis A. The five recesses or bores 4C are here in particular formed as grooves in the half-shell body 1B which extend or run along the inner surface 3B from the front face 5B of the half-shell body 1B to the rear face of the half-shell body 1B, but the half-shell body 1B is not limited to such a form. In particular, one or more recesses or bores 4C can extend or run not completely along the inner surface 3B from the front face 5B of the half-shell body 1B to the rear face of the half-shell body 1B. The recesses or bores 4C can in particular be formed rotationally symmetrically with respect to the body axis A. It is thus possible to ensure in particular a uniform distribution of a material, for example an elastomer, during a jacketing process, for example overmolding, of the half-shell body 1B.

The half-shell body 1B further has at least one, in particular four inner rib elements 7B, wherein the inner rib elements 7B are disposed on the inner surface 3B of the half-shell body 1B. In particular, two adjacent recesses or bores 4C are separated by at least one inner rib element 7B. The inner rib elements 7B are in particular in the form of inner axial rib elements which are formed substantially parallel to the body axis A. Preferably, the inner rib elements 7B are formed integrally or in one piece with the half-shell body 1B.

The inner rib elements 7B and the recesses or bores 4C here form a stiffening device 8B of the half shell. The stiffening device 8B is, however, not limited to such a form and instead can have any combination of the features described herein of the stiffening devices.

Figure 10A:
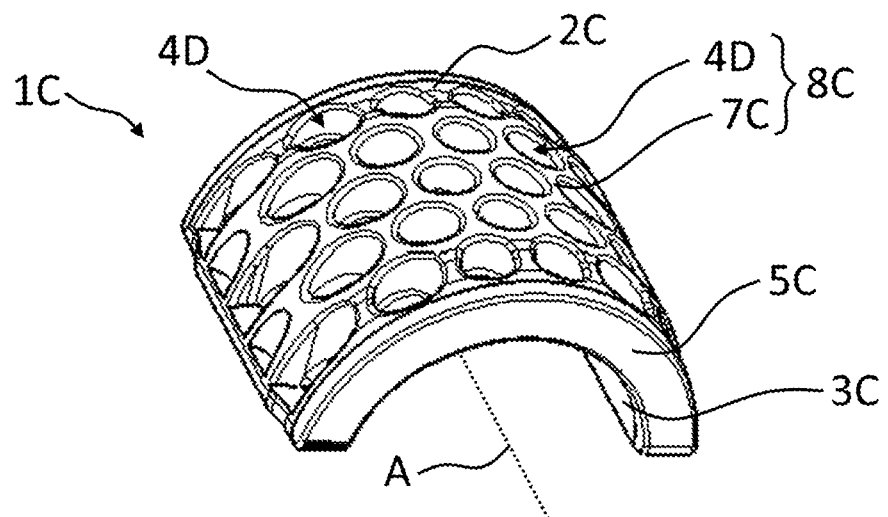
FIG. 10A and FIG. 10B are a top and a bottom perspective view of a further half-shell body.

FIG. 10A is a top perspective view of a further exemplary embodiment of a half-shell body 1C. The half-shell body 1C is here in particular formed in one piece. Furthermore, the half-shell body 1C is in hollow cylindrical form, wherein the half-shell body 1C corresponds substantially to a hollow cylinder which is cut into half along its axis.

The half-shell body 1C has an inner surface 3C and an outer surface 2C. The half-shell body 1C further has a front face 5C and a rear face (not shown for illustrative reasons), wherein the front face 5C and the rear face are disposed opposite to one another on the half-shell body 1C. The front face 5C and the rear face are in particular formed parallel to one another, and a normal vector of the front face 5C is in particular formed parallel to the body axis A.

The half-shell body 1C has a plurality of parallel recesses or bores 4D, wherein the recesses or bores 4D are preferably formed substantially parallel to a common direction or parallel to one another. The plurality of parallel recesses or bores 4D are here in particular formed over the entire outer surface 2C. The plurality of parallel recesses or bores 4D are here preferably so formed that none of the plurality of parallel recesses or bores 4D cuts the front face 5C. It is thus possible to ensure in particular a uniform distribution of a material, for example an elastomer, during a jacketing process, for example overmolding, of the half-shell body 1C.

The half-shell body 1C further has a plurality of outer rib elements 7C, wherein the outer rib elements 7C are disposed on the outer surface 2C of the half-shell body 1C. In particular, two adjacent recesses or bores 4D are separated by at least one outer rib element 7C. The outer rib elements 7C are preferably disposed along edges of a tiling of the outer surface 2C, in particular according to a hexagonal honeycomb pattern. Preferably, the outer rib elements 7C are formed integrally or in one piece with the half-shell body 1C. Furthermore, by means of the arrangement of parallel recesses or bores 4D and outer rib elements 7C that is shown, a rib wall diameter of the rib elements 7C can be formed equal for substantially all the rib elements 7C.

The outer rib elements 7C and the recesses or bores 4D here form a stiffening device 8C of the half shell. The stiffening device 8C is, however, not limited to such a form and instead can have any combination of the features described herein of the stiffening devices.

Figure 10B:
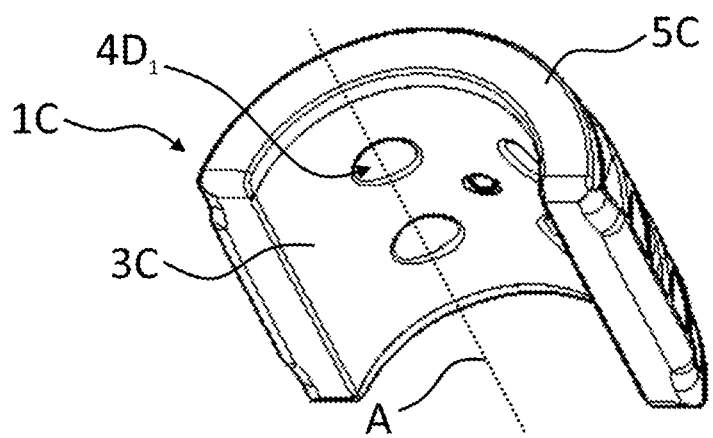

FIG. 10B is a bottom perspective view of the further exemplary embodiment of a half-shell body 1C. Here, in particular four of the plurality of parallel recesses or bores 4D are in the form of through-holes $4D_1$. The through-holes $4D_1$ are here open in particular both to the outer surface 2C and to the inner surface 3C, so that a more efficient distribution of material during a jacketing process, for example overmolding, is made possible. In the middle of the through-holes $4D_1$ there can be disposed a central depression, which constitutes a well for the injection point.

Figure 11:
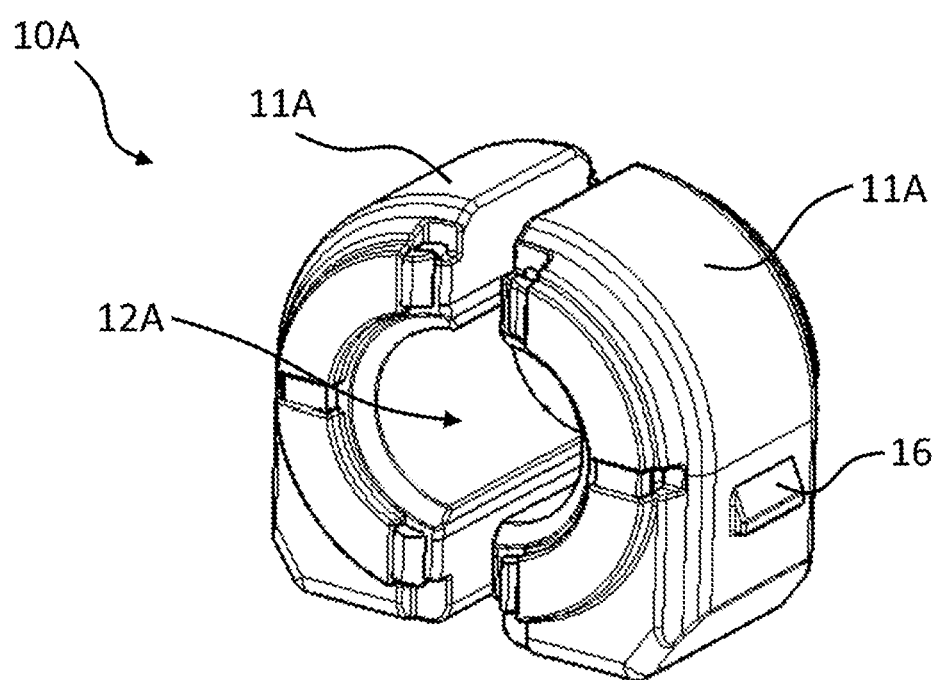
FIG. 11 is a perspective view of a torsion bar bearing.

FIG. 11 is a perspective view of an exemplary embodiment of a torsion bar bearing 10A. The torsion bar bearing 10A is here formed in particular of two half shells, wherein each half shell in particular comprises a jacket means 11A which encloses a half-shell body (not shown) and a stiffening device (not shown). The half-shell body here corresponds, by way of example, to the half-shell body 1C of FIGS. 10A and 10B but can correspond to a half-shell body having any combination of the features described herein.

The respective jacket means 11A here in particular completely encloses the respective half-shell body 1C, wherein the jacket means 11A and the respective half-shell body 1C are permanently connected. The jacket means 11A is here formed, by way of example, of an elastomer. The two jacket means 11A and the half-shell bodies 1C each enclosed thereby are in particular so oriented in the torsion bar bearing 10A that a cylindrical torsion bar receiver 12A for receiving or supporting a torsion bar is formed along a bearing axis of the torsion bar bearing 10A. The bearing axis of the torsion bar bearing 10A corresponds in particular to an axis of a torsion bar which is supported by the torsion bar bearing 10A. Preferably, the jacket means 11A are identical.

The jacket means 11A in particular each have at least one latching hook portion 16 which is disposed on an outer surface of the torsion bar bearing 10A. The latching hook portion is in particular configured to secure the torsion bar bearing 10A or the jacket means 11A to an external element, for example a bearing clamp. It is here to be noted that a geometry of the outer surface of the torsion bar bearing 10A can substantially be adapted to a geometry of the external element, in order to permit a good connection.

Figure 12A:
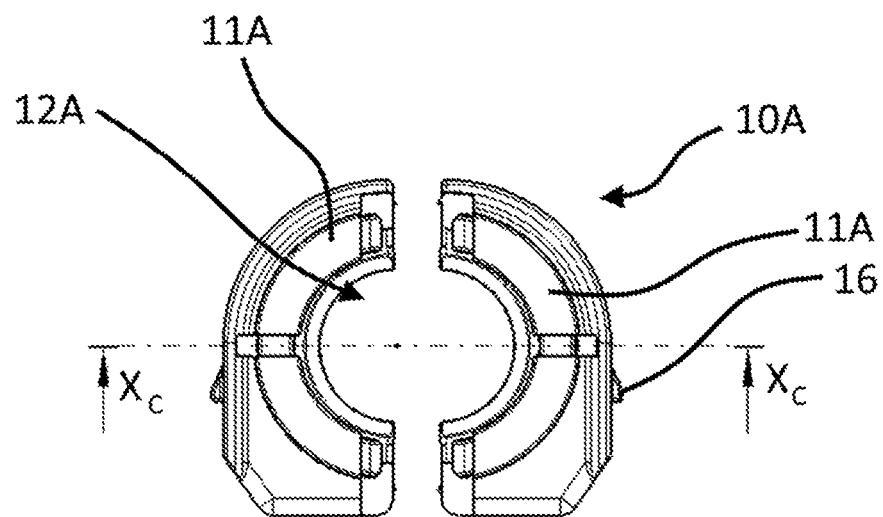
FIG. 12A and FIG. 12B are a front view and a cross-sectional view of the torsion bar bearing according to FIG. 11.
Figure 12B:
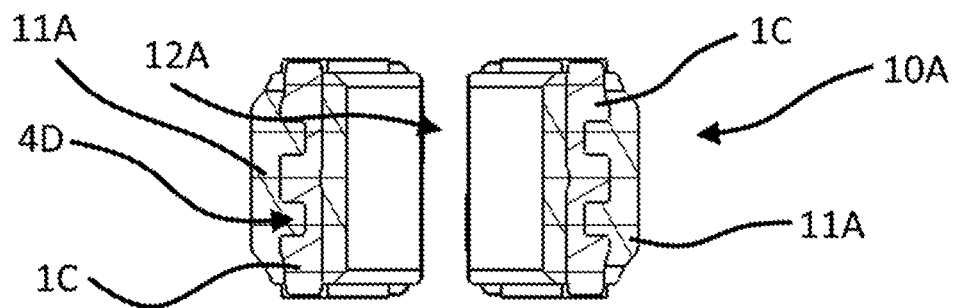

FIG. 12A is a front view of the exemplary embodiment of a torsion bar bearing 10A. FIG. 12B is a cross-sectional view of the torsion bar bearing 10A from FIG. 12A along the sectional plane Xc-Xc. Each jacket means 11A here encloses a half-shell body 1C in particular substantially completely.

The jacket means 11A can have a plurality of slots, in the present case three slots offset by approximately 90°, at which the half-shell body 12C is not covered by the jacket means 11A. These slots can be created by supports in the vulcanization tool for holding the half-shell body 1C. The supports serve to correctly position the half-shell body 1C. The jacket means 11A is preferably formed of an elastomer and in particular completely fills the recesses or bores 4D. A good connection between the half-shell body 1C, the stiffening device and the jacket means 11A is thus ensured.

Figure 13:
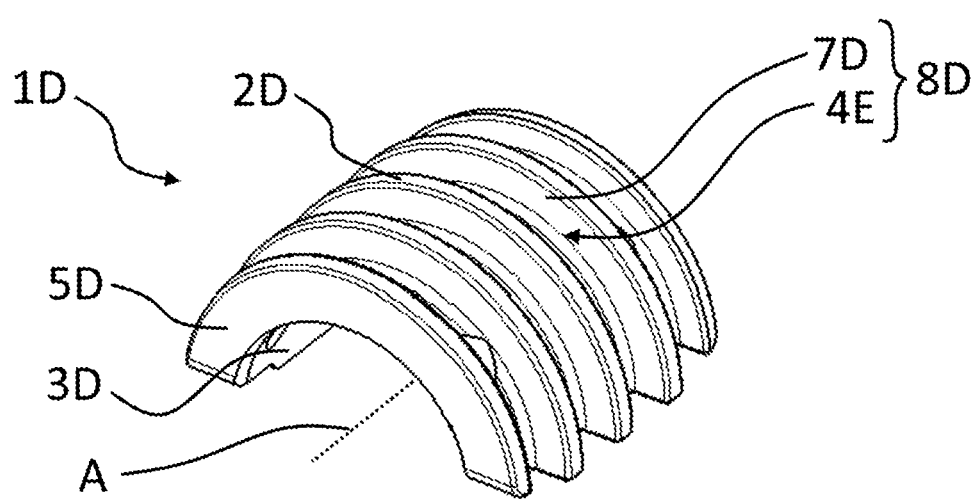
FIG. 13 is a perspective view of a further half-shell body.

FIG. 13 is a perspective view of a further exemplary embodiment of a half-shell body 1D. The half-shell body 1D is here in particular formed in one piece. Furthermore, the half-shell body 1D is of hollow cylindrical form, wherein the half-shell body 1D corresponds substantially to a hollow cylinder which is cut into half along its axis.

The half-shell body 1D has an inner surface 3D and an outer surface 2D. The half-shell body 1D further has a front face 5D and a rear face (not shown for illustrative reasons), wherein the front face 5D and the rear face are disposed opposite to one another on the half-shell body 1D. The front face 5D and the rear face are in particular parallel to one another, and a normal vector of the front face 5D is in particular formed parallel to the body axis A.

The half-shell body 1D has a plurality of circumferential recesses or bores 4E, in particular four, wherein the recesses or bores 4E are formed along the outer surface 2D. The plurality of circumferential recesses or bores 4D are here formed in particular over the entire outer surface 2D. The plurality of circumferential recesses or bores 4E are here preferably disposed at equal intervals in a direction along the body axis A.

The half-shell body 1D further has a plurality of outer rib elements 7D, in particular three, wherein the outer rib elements 7D are disposed on the outer surface 2D of the half-shell body 1C. In particular, two adjacent recesses or bores 4E are separated by at least one outer rib element 7D. The outer rib elements 7D are preferably in the form of circumferential outer rib elements 7D. Preferably, the outer rib elements 7D are formed integrally or in one piece with the half-shell body 1D.

The outer rib elements 7D and the recesses or bores 4E here form a stiffening device 8D of the half shell. The stiffening device 8D is, however, not limited to such a form and instead can have any combination of the features described herein of the stiffening devices.

Figure 14:
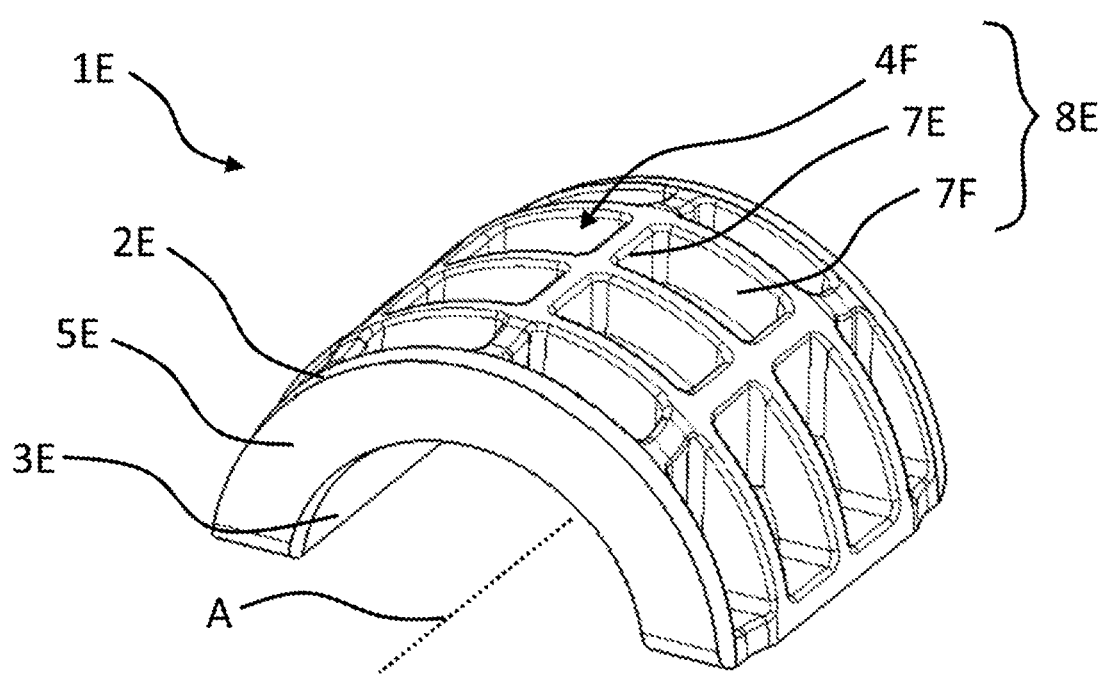
FIG. 14 is a perspective view of a further half-shell body.

FIG. 14 is a perspective view of a further exemplary embodiment of a half-shell body 1E. The half-shell body 1E is here in particular formed in one piece. Furthermore, the half-shell body 1E is in hollow cylindrical form, wherein the half-shell body 1E corresponds substantially to a hollow cylinder which is cut into half along its axis.

The half-shell body 1E has an inner surface 3E and an outer surface 2E. The half-shell body 1E further has a front face 5E and a rear face (not shown for illustrative reasons), wherein the front face 5E and the rear face are disposed opposite to one another on the half-shell body 1E. The front face 5E and the rear face are in particular parallel to one another, and a normal vector of the front face 5E is in particular parallel to the body axis A.

The half-shell body 1E has a plurality of parallel recesses or bores 4F, wherein the recesses or bores 4F are preferably formed substantially parallel to a common direction or parallel to one another. The plurality of parallel recesses or bores 4F are here in particular formed over the entire outer surface 2E. The plurality of parallel recesses or bores 4F are here preferably so formed that none of the plurality of parallel recesses or bores 4F cuts the front face 5E. It is thus possible to ensure in particular a uniform distribution of a material, for example an elastomer, during a jacketing process, for example overmolding, of the half-shell body 1E.

The half-shell body 1E further has a plurality of outer rib elements 7E, 7F, wherein the outer rib elements 7E, 7F are disposed on the outer surface 2E of the half-shell body 1E. The half-shell body 1E here in particular has a plurality of outer axial rib elements 7E which are formed substantially parallel to the body axis A. The half-shell body 1E further has in particular a plurality of outer circumferential rib elements 7F which are disposed along the outer surface 2E and at least partially encircle the body axis A. In particular, outer axial rib elements 7E and outer circumferential rib elements 7F cross at right angles.

Furthermore, in particular two adjacent recesses or bores 4F are separated by at least one outer rib element 7E, 7F. Preferably, the outer rib elements 7E, 7F are formed integrally or in one piece with the half-shell body 1E.

The outer rib elements 7E, 7F and the recesses or bores 4F here form a stiffening device 8E of the half shell. The stiffening device 8E is, however, not limited to such a form and instead can have any combination of the features described herein of the stiffening devices.

The invention is not limited to a single above-mentioned embodiment. Instead, a half shell, a torsion bar bearing and a method of supporting a torsion bar can have any combination of any number of the features described above and in the Figures.

What is claimed is:

1. A half shell for a torsion bar bearing, comprising:
   a half-shell body formed in one piece and along a body axis; and
   at least one stiffening device adapted to increase a rigidity of the half-shell body,
   wherein the half shell comprises a jacket means, which encloses the half-shell body and the at least one stiffening device substantially completely, and
   wherein the jacket means is formed of an elastomer.

2. The half shell according to claim 1, wherein the at least one stiffening device comprises at least one inner rib element,
   wherein the at least one inner rib element is disposed on an inner surface of the half-shell body.

3. The half shell according to claim 2, wherein the at least one inner rib element:
   is formed integrally or in one piece with the half-shell body; or
   is adapted to be mounted on the half-shell body or on the inner surface.

4. The half shell according to claim 1, wherein the at least one stiffening device comprises at least one outer rib element,
   wherein the at least one outer rib element is disposed on an outer surface of the half-shell body.

5. The half shell according to claim 4, wherein the at least one outer rib element:
   is formed integrally or in one piece with the half-shell body; or
   is adapted to be mounted on the half-shell body or on the outer surface.

6. The half shell according to claim 1, wherein the at least one stiffening device comprises at least one internal rib element,
   wherein the at least one internal rib element is disposed in the half-shell body.

7. The half shell according to claim 6, wherein the at least one internal rib element is enclosed by the half-shell body and/or is formed integrally or in one piece with the half-shell body.

8. The half shell according to claim 1, wherein the at least one stiffening device is formed by at least one recess or bore in the half-shell body,
   wherein the at least one recess or bore is disposed between an inner surface of the half-shell body and an outer surface of the half-shell body and/or along the outer surface and/or along the inner surface.

9. The half shell according to claim 8, wherein the at least one recess or bore is open toward the outer surface and partially extends through the half-shell body in the direction of the inner surface; and/or
   wherein the at least one recess or bore is open toward the inner surface and partially extends through the half-shell body in the direction of the outer surface; and/or
   wherein the at least one recess or bore is open toward the outer surface and the inner surface and extends completely through the half-shell body.

10. The half shell according to claim 1, wherein the half-shell body is formed of a metal and/or a plastic and/or a composite material.

11. The half shell according to claim 1, wherein the half shell further comprises a fastening device, which is adapted to secure the half shell to a corresponding half shell, and optionally,
    wherein the fastening device has at least one latching element and/or at least one screw element and/or at least one pressing element.

12. A torsion bar bearing comprising:
    at least one first half shell which is the half shell according to claim 1; and
    at least one second half shell which is the half shell according to claim 1,
    wherein at least one of the at least one first half shell is arranged opposite to at least one of the at least one second half shell with respect to a torsion bar axis.

13. The torsion bar bearing according to claim 12, wherein the torsion bar bearing comprises at least one frame device configured to:
    hold or fix at least one of the at least one first half shell and at least one of the at least one second half shell relative to one another; and/or
    hold or fix at least two of the at least one first half shell relative to one another; and/or
    hold or fix at least two of the at least one second half shell relative to one another.

14. A method for supporting a torsion bar, comprising:
    providing a torsion bar;
    providing at least one first half shell which is the half shell according to claim 1;
    providing at least one second half shell which is the half shell according to claim 1;
    disposing one of the at least one first half shell on the torsion bar; and
    disposing one of the at least one second half shell opposite to the one of the at least one first half shell with respect to a torsion bar axis.

* * * * *